Sept. 5, 1950            A. RUPP            2,521,188
VENTILATOR FOR GRAIN BINS
Filed Aug. 27, 1947            2 Sheets-Sheet 1
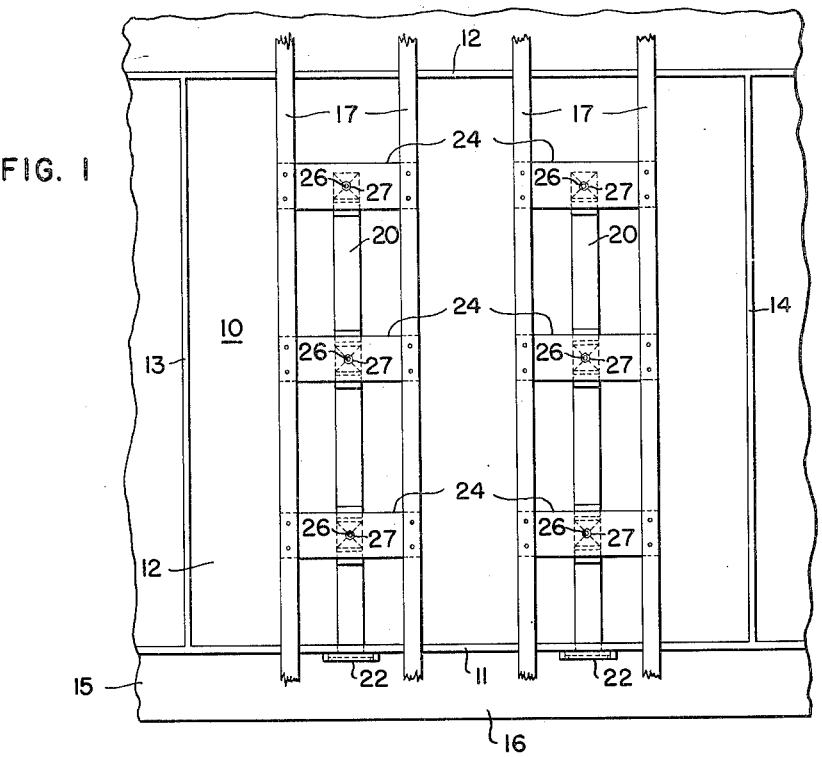
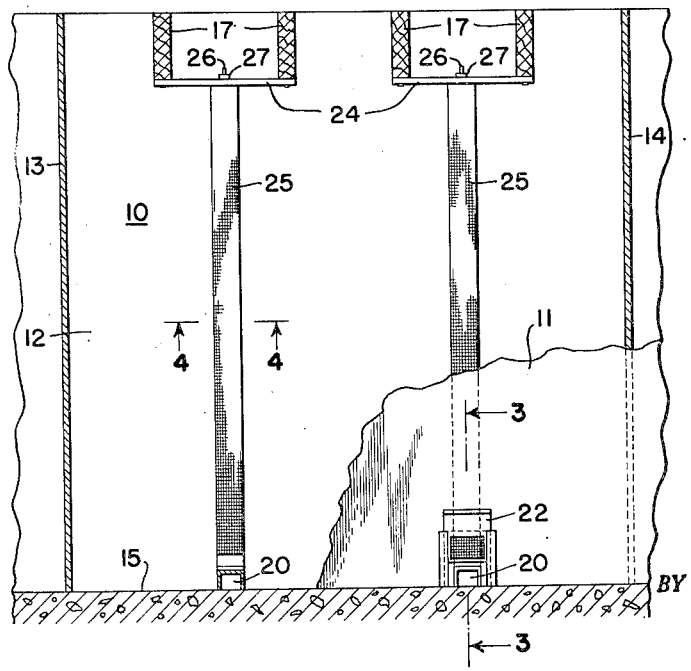
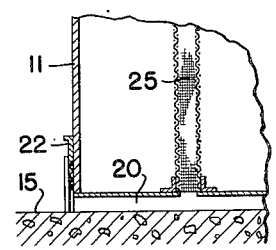
INVENTOR.
ADAM RUPP
BY
ATTORNEY.

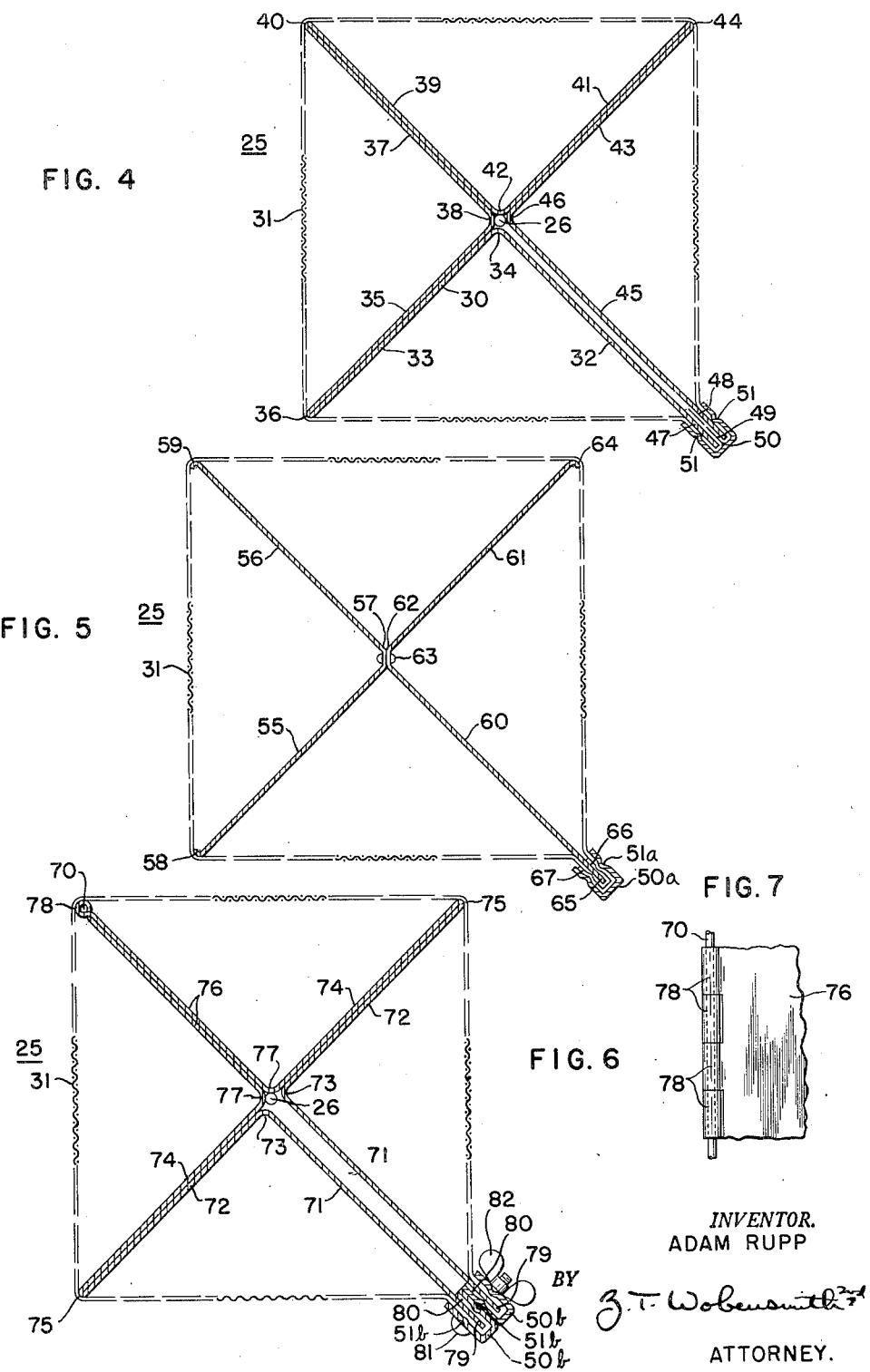

UNITED STATES PATENT OFFICE 2,521,188

VENTILATOR FOR GRAIN BINS

Adam Rupp, Keller's Church, Pa.

Application August 27, 1947, Serial No. 770,934

8 Claims. (Cl. 98—55)

This invention relates to ventilators for grain bins and more particularly to improved constructions for this purpose.

Various devices have heretofore been proposed for use with grain bins for carrying off the heat and moisture from the grain stored in the bin, but none of these have proven wholly satisfactory. The ventilators heretofore available have, in some instances, been difficult if not impossible to clean, or were of a very complicated and heavy construction, or did not provide adequate support for the foraminous material used in connection therewith.

Other ventilators which have heretofore been proposed have been constructed in a manner which renders the cost thereof prohibitive and beyond the reach of ordinary users, or constructed in a manner which would render it difficult for ordinary users to install the same.

It is the principal object of the present invention to provide a ventilator for grain bins which provides adequate ventilation for the grain so that heat and moisture may be removed, and which may be readily assembled as desired by the user.

It is a further object of the present invention to provide a ventilator for grain bins which may be cheaply and easily constructed, which is of light weight but sturdy construction, and in which the wire mesh forming part thereof is adequately supported and maintained in position.

It is a further object of the present invention to provide a ventilator for grain bins which may be readily cleaned and which will be proof against rats and other animals.

It is a further object of the present invention to provide a ventilator for grain bins in which the ventilating units are constructed of formed sheet metal with wire mesh supported and maintained in taut condition thereon.

It is a further object of the present invention to provide a ventilator for grain bins which may be installed without the necessity for making any holes or openings in the floor of the bin.

Other objects and advantageous features of the invention will be apparent from the specification and claims.

The nature and characteristic features of the invention will be more readily understood from the following description, taken in connection with the accompanying drawings forming part hereof, in which:

Figure 1 is a plan view of a grain bin provided with ventilators in connection with the present invention;

Figure 2 is a view partly in front elevation and partly in vertical section of the grain bin shown in Fig. 1;

Figure 3 is a fragmentary sectional view taken approximately on the line 3—3 of Fig. 2;

Figure 4 is a horizontal sectional view, enlarged, taken approximately on the line 4—4 of Fig. 2;

Figure 5 is a horizontal sectional view similar to Fig. 4 of a modified form of ventilator in accordance with the present invention;

Figure 6 is a view similar to Fig. 5 showing another modified form; and

Figure 7 is a fragmentary elevational view showing certain of the details of construction of the ventilator unit of Fig. 6.

It should, of course, be understood that the description and drawings herein are illustrative merely, and that various modifications and changes may be made in the structure disclosed without departing from the spirit of the invention.

Referring now more particularly to Figs. 1 to 3 of the drawings, a grain bin 10 is illustrated having a vertical front wall 11, a vertical rear wall 12, vertical side walls 13 and 14, and a floor 15 with an aisle 16 in front of the wall 11 and with horizontally disposed roof rafters 17 spaced above the floor 15. In accordance with the present invention a plurality of horizontal ducts 20 are provided in parallel relationship on the floor 15 between the rafters 17 as seen from above, and extending rearwardly from the wall 11.

The ducts 20 are preferably constructed of sheet metal which is rust proof or coated with rust proofing material. For this purpose sheet aluminum or galvanized sheet iron or steel may be employed.

The ducts 20 are closed at their rear ends and at the front ends and at the wall 11, accessible from the aisle 16, sliding doors 22 are provided which may be of wire mesh or screening but are preferably of sheet metal and are manually movable to regulate the flow of air therethrough as hereinafter explained.

The rafters 17 are provided at spaced intervals between the wall 11 and the wall 12 with cover plates 24 preferably of light sheet metal secured on the underside thereof in any suitable manner. Extending vertically between the cover plates 24 and the ducts 20 a plurality of spaced ventilators 25 are provided, the ventilators 25 being in communication with and secured at their lower ends to the ducts 20 in any desired manner, and secured permanently or removably, as desired.

The upper ends of the ventilators 25 are preferably closed by the cover plates 24 secured by bolts 26 carried by each ventilator 25 and nuts 27.

Referring now more particularly to Fig. 4 of the drawings, in which the details of a preferred form of vertical ventilator 25 are shown, the ventilator 25 includes a body portion 30 and a cover 31.

The body portion 30 comprises a strip of sheet metal bent and formed to provide vertical walls. The sheet metal is preferably rust proof and may consist of sheet aluminum or galvanized iron or steel sheets. The vertical walls include a wall portion 32, a wall portion 33 disposed at a right angle with respect to the wall portion 32 and connected to the wall portion 32 by a fold 34, a wall portion 35 extending along the wall portion 33 and connected to the wall portion 33 by a fold 36, a wall portion 37 disposed at a right angle with respect to the wall portion 35 and connected to the wall portion 35 by a fold 38, a wall portion 39 connected to the wall portion 37 by a fold 40 and extending therealong, a wall portion 41 disposed at a right angle with respect to the wall portion 39 and connected thereto by a fold 42, a wall portion 43 connected to the wall portion 41 by a fold 44 and extending therealong, and a wall portion 45 disposed at a right angle to the wall portion 43 and connected thereto by a fold 46, the wall portion 45 extending in alinement with the wall portion 32.

There is thus provided a body having, when clamped as hereinafter explained, substantial strength and rigidity with outer edges at the folds 36, 40 and 44, and with passageways between the wall portions 32 and 33, 35 and 37, 39 and 41, and 43 and 45, respectively for air and for cleaning as hereinafter explained.

The body 30 is enclosed within the cover 31 which is preferably in the form of a woven screen. The screen may be of any desired material resistant to moisture and may be of galvanized iron wire, brass or bronze or of synthetic plastic.

The screen is of relatively fine mesh to prevent the passage of particles of grain therethrough but to permit the passage of moisture laden and warm air from the grain. The cover 31 is secured in taut condition in engagement with the edge folds 36, 40 and 44 and for this purpose the wall portions 32 and 45 are respectively provided with outwardly disposed extensions 47 and 48. The covering screen material of the proper length and width is brought around the outside of the body 30 with the edges 49 inbent, and a C-shaped strip 50 is applied to enclose the edge portions 47 and 48 of the wall portions 32 and 45 and the covering 31 adjacent thereto, and crimped as at 51. The assembly of the C-shaped strip 50 and the crimping 51 are utilized to impart to the covering 31 the desired degree of tension to maintain the same in assembled and taut condition. The bolt 26 may be welded at the center folds.

In Figure 5 a different form of sheet metal body is illustrated consisting of two body sections and a cover 31. One of the body sections includes wall portions 55 and 56, at right angles to each other, and connected at their inner ends by a central strip 57, the outer ends 58 and 59 of the wall portions 55 and 56 being formed into a rounded bead. The other body section includes wall portions 60 and 61 at right angles to each other, and to the wall portions 56 and 55, and connected at their inner ends by a central strip 62. The body sections are secured together at the strips 57 and 62 in any desired manner such as by rivets 63. The wall portion 61 has a beaded edge 64 and the wall portion 60 has outwardly disposed extension 65. The body is provided, as before with a cover 31 of screening, and one of the side edges 66 thereof is turned back in engagement with the extension 65 and the other side edge 67 is turned back so as to enclose the first mentioned side edge 66. A C-shaped clamping strip 50a is applied and crimped as at 51a for the purpose of tensioning the wire and holding the wire covering in assembly in taut relationship after assembly with respect to the body.

In Figures 6 and 7 the body is illustrated as made of two sheet metal sections hinged together by means of a hinge pin 70. The body sections preferably each include wall portions 71 to which vertical wall portions 72 are connected by folds 73, the wall portions 72 being disposed at right angles with respect to the wall portions 71. The wall portions 72 have wall portions 74 connected thereto along edge folds 75, the wall portions 74 and 72 being in alinement. The wall portions 74 have wall portions 76 connected along folds 77. The outer ends 78 of the wall portions 76 are bent to form hinge portions 78 for engagement by the hinge pin 70. The body is enclosed as before within a covering 31 of screening. The ends 80 of the screening 31 are respectively turned back on extensions 79 of the wall portions 71 and held in position with respect thereto by clamping strips 50b of C-shape, crimped at 51b.

In assembling the ventilator as shown in Fig. 6 the body portions are connected by the hinge pin 70 and the body portions opened. Covering wire 31 of the desired length is applied in engagement with the hinge portions 78, and the ends 80 hooked over the extensions 79. The clamping strips 50b are each applied thereto and secured by crimping. Upon folding the wire covering 31 is tightened and brought into engagement with the edge folds 75 as well as with the hinged portions 78. Bolts 81 and butterfly nuts 82, extending through the ends 79 and 80 and the clamping strips 50b are employed for holding the body portions in assembled relationship. The bolt 26 may be welded to one of the body portions at the center folds.

The mode of operation will now be pointed out.

Prior to the filling of the grain bin 10 the horizontal ducts 20 are mounted on the floor 15, the plate 24 mounted on the roof rafters 17 and the ventilators 25 placed in vertical position and secured with the nuts 27 on the bolts 26.

The grain is then placed in the bin 10 with the upper ends of the ventilators 25 exposed. The doors 22 are opened to the desired extent to permit air to enter the horizontal ducts 20 and rise in the ventilators 25. The air in its upward passage carries with it moisture and heat from the grain thereby aiding in conditioning the grain and obviating spoiling. The rate of carry-off of the heat and moisture may be varied by changing the positioning of the doors 22.

The body portions of the ventilators by reason of their shape and arrangement are adequately rigid and by reason of the nature of the mounting and bracing of the wire covering 31 the same is also adequately supported and prevented from sagging. The passageways between the walls of the body portions provide ample spaces for the upward passage of the air while at the same time providing spaces for the insertion of brushes for cleaning.

Access of rats and other vermin to the grain is obviated by the closing of the tops of the ventilators 25, preventing entrance at this location, and by the doors 22 preventing entrance at the bottom.

I claim:

1. In ventilating apparatus for grain bins, a vertically extending body of sheet metal bent and shaped to provide radially disposed vertical wall portions meeting at the center and having outer vertical edges, an enclosing cover of foraminous material in engagement with the said vertical edges and disposed in flat panels between said edges, and a vertically extending clamping member for securing the vertical ends of said cover at one of said edges of said body.

2. In ventilating apparatus for grain bins, a vertically extending body of sheet metal bent and shaped to provide radially disposed vertical wall portions meeting at the center and having outer vertical edges, an enclosing cover of foraminous material in engagement with the said vertical edges and disposed in flat vertical panels between said edges, and a vertically extending C-shaped clamping member disposed along one of said edges for securing the vertical ends of said cover at said one of said edges of said body.

3. In ventilating apparatus for grain bins, a vertically extending body of sheet metal bent and shaped to provide radially disposed wall portions meeting at the center and having a plurality of outer vertical edges curved in horizontal cross section, an enclosing cover of foraminous material in engagement with said vertical edges and disposed in flat vertical panels between said edges, said body also having an outer vertical clamping edge, and a clamping member for securing the vertical ends of said cover at said clamping edge.

4. In ventilating apparatus for grain bins, a vertically extending body of sheet material consisting of two body sections V-shaped in horizontal cross section arranged with the root portions contiguous and secured together to provide radially extending wall portions with vertical edges, an enclosing cover of foraminous material in engagement with and in flat vertical panels between said vertical edges, and a clamping member for securing the vertical edges of said cover at one of said vertical edges of said body.

5. In ventilating apparatus for grain bins, a vertically extending body of sheet material consisting of two body sections V-shaped in horizontal cross section arranged with the root portions contiguous and secured together to provide radially extending vertical wall portions with vertical outer edges, the outer vertical edges of a plurality of said wall portions being curved in horizontal cross section, an enclosing cover of foraminous material in engagement with and disposed in flat vertical panels between said vertical edges, one of said body sections having an outer vertical clamping edge and a clamping member for securing the vertical edges of said cover at said clamping edge.

6. In ventilating apparatus for grain bins, a vertically extending body of sheet material consisting of two body sections V-shaped in horizontal cross section arranged with the root portions contiguous and secured together to provide radially extending vertical wall portions with vertical outer edges, an outer enclosing cover of foraminous material in engagement with and disposed in flat vertical panels between said vertical edges, and a vertically disposed C-shaped clamping member for securing the vertical edges of said cover at one of said outer vertical edges.

7. In ventilating apparatus for grain bins, a vertically extending body of sheet metal, said body consisting of two body sections T-shaped in horizontal cross section arranged back to back to provide radially disposed wall portions with vertical edges, said body sections being hingedly connected at one of said edges, and an enclosing cover of foraminous material secured respectively to edges of said body sections opposite to said hingedly connected edges, said cover being disposed in flat vertical panels between said edges.

8. In ventilating apparatus for grain bins, a vertically extending body of sheet metal, said body consisting of two body sections T-shaped in horizontal cross section arranged back to back to provide radially disposed wall portions with vertical outer edges, said body sections being hingedly connected at one of said edges, an enclosing cover of foraminous material for engagement with and disposed in flat vertical panels between said vertical edges and secured respectively to edges of said body sections opposite to said hingedly connected edges, and fastening members for securing the edges opposite the hingedly connected edges in assembled relationship.

ADAM RUPP.

REFERENCES CITED

The following references are of record in the file of this patent:

UNITED STATES PATENTS

| Number | Name | Date |
| --- | --- | --- |
| 726,801 | Maxwell | Apr. 28, 1903 |
| 1,000,088 | Haas | Aug. 8, 1911 |
| 1,021,409 | Huber | Mar. 26, 1912 |
| 1,319,267 | Brown | Oct. 21, 1919 |
| 1,383,787 | Calhoon | July 5, 1921 |
| 1,630,308 | Pazzi et al. | May 31, 1927 |
| 1,977,715 | Coleman | Oct. 23, 1934 |
| 2,097,600 | Pavlecka | Nov. 2, 1937 |
| 2,198,985 | Bailey | Apr. 30, 1940 |